United States Patent [19]

Kosaka et al.

[11] Patent Number: 4,711,749

[45] Date of Patent: Dec. 8, 1987

[54] PROCESS FOR PRODUCING MICROCAPSULES

[75] Inventors: Takao Kosaka, Himeji; Fumio Okumura, Takasago; Hirokazu Tsukahara, Tokyo, all of Japan

[73] Assignee: Mitsubishi Paper Mills, Ltd., Tokyo, Japan

[21] Appl. No.: 795,874

[22] Filed: Nov. 7, 1985

[51] Int. Cl.[4] ............................................. B01J 13/02
[52] U.S. Cl. ..................................... 264/4.7; 503/215; 424/462; 424/497; 427/213.34; 428/402.22
[58] Field of Search .................. 264/4.7; 428/402.22; 346/215

[56] References Cited

U.S. PATENT DOCUMENTS 4,406,816  9/1983  Sliwka ............................ 264/4.7 X
4,574,110  3/1986  Asano et al. .................... 264/4.7 X

FOREIGN PATENT DOCUMENTS 2543019  9/1984  France ............................... 264/4.7

*Primary Examiner*—Richard D. Lovering
*Attorney, Agent, or Firm*—Cushman, Darby & Cushman

[57] ABSTRACT

A stable emulsion of microcapsules is obtained by polymerizing at least one water-soluble vinyl monomer in an aqueous solution of an oil-soluble vinyl monomer-maleic anhydride-maleic ester multipolymer to prepare a water-soluble resin, dispersing or emulsifying discrete fine particles of a hydrophobic material in an acidic aqueous solution of the water-soluble resin, adding an amino resin precursor separately prepared to the dispersion or emulsion, and heating the mixture.

6 Claims, No Drawings

PROCESS FOR PRODUCING MICROCAPSULES

FIELD OF THE INVENTION

The present invention relates to a process for producing microcapsules and more particularly to a process for producing microcapsules improved so as to be well fitted for pressure-sensitive recording sheets.

DESCRIPTION OF THE PRIOR ART

Microcapsules are microscopic-sized containers usually seamless which enclose a gaseous, liquid, or solid useful ingredient. Functions of microcapsules are to modify the core material in apparent form and in properties, to protect the material in microscopic form, and to control the releasability of the material or liberate it at a time when the liberation is necessary.

As industrial applications, microcapsules are used for pressure-sensitive recording sheets, pharmaceuticals, perfumes, liquid crystals, adhesives, foods, etc. In particular, the microcapsule technique has found successful use in pressur-esensitive recording sheets as one of the essential techniques to support this recording industry.

Among the methods for producing microcapsules, chemicals processes such as the coacervation process, interfacial polymerization process, and the in situ polymerization process are superior in view of the ability to hold core materials, the uniformity of capsule shapes, the diversity of capsule design, and the mass industrial productivity. Specially, the in situ polymerization process is considered to give microcapsules well suited as an information-recording material, the on-off property of which is regarded as important, in that none of naturally occurring materials but synthetic-chemically well-defined materials are employed to form capsule walls and the formed capsule walls are strong and durable.

Previously the present applicant proposed processes for producing microcapsules as novel methods which falls under the category of the in situ polymerization process, in Japanese patent application Nos. 116,249/77 and 120,588/77 (Laid-Open Nos. 49984/79 and 53679/79, respectively). These processes comprise dispersing or emulsifying a hydrophobic material in an acidic aqueous solution of an oil-soluble vinyl monomer (e.g. styrene)-maleic anhydride copolymer to form discrete fine particles, then adding an amino resin precursor, and reacting it by heating in an acidic state to form capsule walls.

When these processes are applied to produce microcapsules for pressure-sensitive recording sheets, the resulting microcapsules may appear slightly colored depending upon the leuco dye which is an acid-working color former often used as an useful ingredient, i.e. the core material in the form of solution. Accordingly these processes are sometimes unfit for the production of such recording sheets which is required whiteness.

Then the present applicant disclosed improved processes in Japanese patent application Nos. 51,091/83 (Laid-Open No. 177129/84) and 74,534/84, wherein a partial ester of oil-soluble vinyl monomer (e.g. styrene)-maleic anhydride copolymer (i.e. an oil-soluble vinyl monomer (e.g. styrene)-maleic anhydridemaleic ester multipolymer) is used in place of the oil-soluble vinyl monomer (e.g. styrene)-maleic anhydride copolymer, thereby solving the above noted problem (the coloration of microcapsules) and simultaneously achieving desirable effects such as increased rates of emulsifying the hydrophobic liquid material and decreased viscosities of the microcapsule emulsion.

However, further investigations of these improved processes under process conditions (e.g. temperature of encapsulation reaction, total concentration, amount of multipolymer used, pH, nature of useful ingredient in the core material, etc.) which were varied more widely, revealed that the processes employing an oil-soluble vinyl monomer-maleic anhydride-maleic ester multipolymer involve the following problem. That is, lower temperatures, lower pH values, or milder agitation during encapsulation reaction tends to result in insufficient formation of capsule walls and hence to provide a capsule emulsion containing a large amount of free (unmicroencapsulated) core material and therefore the product is unfitted for industrial use.

When such an encapsulation process sensitive to variations in the process conditions is applied to the industrial production, a slight error in setting of conditions or an unexpected variation in the conditions may lead to the undesirable production of defective products. This will much restrict the industrial application of the encapsulation process.

SUMMARY OF THE INVENTION

An object of the present invention is to provide a process for producing microcapsules which is capable of steady encapsulation under a wide variety of conditions, for instance, in a wide pH range.

As a result of extensive studies in search of a water-soluble resin with which the above noted problems can be solved while maintaining various advantages of the oil-soluble vinyl monomer-maleic anhydride-maleic ester multipolymer, it has been found that the above and other objects of the invention are achieved with a novel water-soluble resin obtained by polymerizing at least one water-soluble vinyl monomer in an aqueous solution of said multipolymer. It may be noted that such improving effect as of the present invention cannot be achieved by using a polymer mixture of the multipolymer with a polymer which is prepared by polymerizing the same water-soluble vinyl monomer in the absence of the multipolymer.

DETAILED DESCRIPTION OF THE INVENTION

The oil-soluble vinyl monomer-maleic anhydridemaleic ester multipolymer is a copolymer composed of three or more monomers wherein the molar ratio of the oil-soluble vinyl monomer to the combination of the maleic anhydride with the maleic ester is approximately 50 : 50. The maleic ester may be either a monoester or a diester. The alcohol which constitutes the ester moiety of the maleic ester is of a $C_1$–$C_{10}$ alkanol, alkenol, or aralkanol in which one or more hydrogen atoms directly linked to a carbon atom may be replaced by one or more hydroxyl groups. The multipolymer can be prepared by copolymerizing a mixture of necessary monomers according to the ordinary method or by reacting an alcohol or alcohols with an oil-soluble vinyl monomermaleic anhydride copolymer previously prepared. The water-soluble resin used in the present invention is obtained by adding a necessary amount of at least one water-soluble vinyl monomer to an aqueous solution of oil-soluble vinyl monomer-maleic anhydride-maleic ester multipolymer prepared in the above stated manner (the pH may be adjusted, if necessary, by adding an alkali to said aqueous solution), followed by the polymerization in the presence of a polymerization initiator which is optionally added.

Any oil-soluble, in other words, lipophilic or hydrophobic vinyl monomer copolymerizable with maleic anhydride can be used herein for the oil-soluble vinyl monomer-maleic anhydride-maleic ester multipolymer. In view of the industrial adaptability, however, preferred monomers are ethylene, methyl vinyl ether, propylene, isobutylene, butadiene, vinyl acetate, linear α-olefins of 4–14 carbon atoms, and styrene.

A water-soluble vinyl monomer is then added to an aqueous solution of the above defined multipolymer, followed by the polymerization. Preferred examples of the water-soluble vinyl monomer are acrylamide, N-methylolacrylamide, 2-acrylamide-2-methylpropanesulfonic acid and salts thereof, allylsulfonic acids and salts thereof, styrenesulfonic acid and salts thereof, acrylic acid and salts thereof, methacrylic acid and salts thereof, vinyl acetate, methyl vinyl ketone, and methyl vinyl ether, though the water-soluble vinyl monomers used in the invention are not limited to these compounds.

In the microcapsule production process of the invention, an aqueous solution of the above water-soluble resin is first prepared. In this case, the aqueous solution is adjusted to a desired pH (usually 7) with a suitable alkali or acid. A hydrophobic material containing a useful ingredient is added to this solution and the mixture is stirred vigorously at a desired temperature to form an emulsion, where emulsified particle sizes (mostly of μm order) are checked.

Approximately 2 to 20 parts of the water-soluble resin is used per 100 parts of the hydrophobic material. An amino resin precursor prepared separately to form capsule walls is added to the emulsion. Suitable pH values of the resulting liquid are lower than 7, particularly from 4.0 to 6.5. In addition, as the pH is lowered in the above range, the polymerization of the precursor proceeds more rapidly and the formed capsule walls become stronger.

Thus the in situ polymerization is carried out by heating the mixture with stirring to form shells (wall films) around fine particules of the hydrophobic material, i.e. to form microcapsules. The polymerization temperature is desirably at least 40° C., preferably from 50° to 95° C. The temperature of course can be varied in several steps during this polymerization. The microcapsule formation is usually completed in several hours.

Amino resin precursors favorably used in the present invention are (1) an amino compound-formaldehyde precondensation product (aqueous solution) obtained by reacting at least one amino compound selected from melamine, guanamine, urea, and derivatives of these compounds with formaldehyde in alkaline water, that is, a methylol-substitution product of the above amino compound and/or a low molecular weight polymer thereof, and (2) an alkyl ether compound derived from methylol-substitution product of the above amino compound and/or a low molecular weight polymer thereof. The precursors of (1), being unstable, are desirably prepared just before use. The precursors of (2), being relatively stable, are commercially available in most cases in the form of aqueous solution or solid (powder).

Brief description is given below on pressure-sensitive recording sheets for which the microcapsules produced by the process of the present invention are predominantly used. This recording sheet system is composed basically of an overlying sheet (CB) and an underlying sheet (CF). The overlying sheet commonly consists of a substrate (base paper) having on the under side a coating layer of microcapsules which contain a solution of a colorless leuco dye typified by crystal violet lactone, 3-N,N-diethylamino-6-methyl-7-anilinofluoran, and rhodamine B lactam, as useful ingredient. The underlying sheet commonly consists of a substrate having on the upper side a coating layer of an inorganic color developer (e.g. acid clay, activated clay, or a silica-magnesia solid acid) or of organic color developer (phenolic compound, e.g. a phenol derivative, novolak type phenol resin, or metal salt of salicylic acid derivative) which causes the above leuco dye to form color. The overlying sheet is superposed on the underlying sheet with both the coating layers facing each other, and a pattern of pressure is exerted on the superposed sheets by means of a writing pen, typewriter, or dot printer to rupture microcapsules, thereby liberating and transferring the useful ingredient to the underlying sheet side, and developing color. Thus an image is recorded. The intermediate sheet (CFB) can also be used which consists of a substrate having a CB layer on one side and a CF layer on the other side.

The pressure-sensitive recording sheet system, since it is nothing but an information recording material, needs to show a high signal/noise ratio, that is, great difference between the image density and the background density. In particular, it is required for microcapsules of the overlying sheet to have high whiteness in themselves and low resposiveness to non-informational stimulation and accordingly uniformity is required for all the individual microcapsules which amount to enormous numbers. In order to meet these requirements on an industrial scale, it is necessary to establish a microcapsule production process having wide tolerances.

The present invention quits meets these requirements. This will be proved by the following examples, which illustrate the invention in more detail. However, the invention is not to be limited to these examples. In the examples, parts are all by weight.

EXAMPLE 1

A solution was prepared by dissolving 6 parts of 3-N,N-diethylamino-6-methyl-7-anilinofluoran as hydrophobic material in 100 parts of diisopropylnaphthalene.

Sodium 2-acrylamide-2-methylpropanesulfonate (80 parts) was dissolved in an aqueous solution containing 113 parts of a terpolymer of styrene-maleic anhydride-mono-n-propyl maleate (50 : 30 : 20 in molar ratio) of molecular weight about 100,000, followed by radical-polymerization to give a 5% aqueous solution (pH was adjusted to 4.0) of a novel water-soluble resin. To 220 parts of this solution was added 180 parts of the above hydrophobic material. The mixture was stirred vigorously in a mixer at 60° C. to form an emulsion.

Separately, an aqueous solution of melamine-formaldehyde precondensation product was prepared by mixing 13 parts of melamine, and 25 parts of 37% formalin with 70 parts water, adding sodium hydroxide to adjust the pH to 9, and heating the mixture.

Then the above emulsion of hydrophobic material is combined with the aqueous solution of melamine-formaldehyde precondensation product and stirred at 50° C. for 2 hours at a lowest possible pH in a weakly acid region (pH 4-5). After confirmation of the microcapsule formation, the mixture was cooled to room temperature. Further, suitable amounts of sodium hydroxide and water were added to adjust the emulsion of microcapsules to pH 9 and a solid concentration of 40%. Then the viscosity at 20° C. was measured.

To 300 parts of the thus obtained capsule-containing liquid were added 30 parts of wheat starch grain and 100 parts of a 10% aqueous poly(vinyl alcohol) solution. The resulting composition was applied on a plan paper of 40 g/m$^2$ to give a dry coating weight of 5 g/m$^2$. Thus an overlying sheet (CB) for pressure-sensitive recording was obtained.

This sheet was combined with a commerical underlying sheet (CF) for pressure-sensitive recording (MitsubishiiNCR Underlying Paper N-40: CF of 40 g/m$^2$base) and subjected to typewriting. It was ascertained therefrom that proper black letters were marked on the CF.

In the next place, intermediate sheet (CFB) was prepared by applying the above CB coating composition on the undersides of the same CF sheets as used above, to give a dry coating weight of 5 g/m$^2$. Then the color-developer coating surface of the intermediate sheet was inspected for the presence of black spots.

Results of the above tests are summarized in Table 1.

EXAMPLE 2

Microcapsules were formed and the suitability thereof for pressure-sensitive recording sheets was tested, by following the procedure of Example 1 except that the water-soluble resin was prepared by using 50 parts of sodium allylsulfonate ($CH_2=CH-CH_2-SO_3Na$) in place of 80 parts of the sodium 2-acrylamide-2-methylpropanesulfonate. Results of the tests are shown in Table 1.

EXAMPLE 3

Microcapsules were formed and the suitability thereof for pressure-sensitive recording sheets was tested, by following the procedure of Example 1 except that the water-soluble resin was prepared by the radical polymerization of 64 parts of sodium 2-acrylamide-2-methylpropanesulfonate in an aqueous solution containing 119 parts of a terpolymer of styrene-maleic anhydride-mono-n-propyl maleate (50 : 20 : 30 in molar ratio). Results of the tests are shown in Table 1.

EXAMPLE 4

Microcapsules were formed and tested by following the procedure of Example 3 except that the water-soluble resin was prepared by using 40 parts of sodium allylsulfonate in place of 64 parts of the sodium 2-acrylamide2-methylpropanesulfonate. Results of the tests are shown in Table 1.

EXAMPLES 5-7

Microcapsules were formed and tested by following the procedure of Example 1 except that the water-soluble resin was prepared by the radical polymerization of 22.4 parts each of sodium 2-acrylamide-2-methylpropanesulfonate, sodium allylsulfonate, and acrylamide in an aqueous solution containing 112.2 parts of a terpolymer of styrene-maleic anhydride-monomethyl maleate (50 : 15 : 35 in molar ratio). Results of the tests are shown in Table 1.

COMPARATIVE EXAMPLE 1

Similar experiments were conducted using a styrene-maleic anhydride (50 : 50 in molar ratio) copolymer as the water soluble resin.

COMPARATIVE EXAMPLE 2

Similar experiments were conducted using a terpolymer of styrene-maleic anhydride-monomethyl maleate (50 : 40 : 10 in molar ratio) as the water-soluble resin.

COMPARATIVE EXAMPLE 3

Similar experiments were conducted using a terpolymer of styrene-maleic anhydride-monomethyl maleate (50 : 15 : 35 in molar ratio) as the water-soluble resin.

COMPARATIVE EXAMPLE 4

Microcapsules were formed and tested by following the procedure of Example 5 except that the water-soluble resin was prepared by adding 22.4 parts of a poly(-sodium 2-acrylamide-2-methylpropanesulfonate) which had been made separately, to an aqueous solution containing 112.2 parts of a terpolymer of styrene-maleic anhydride-monomethyl maleate (50 : 15 : 35 in molar ratio) to form a mixed aqueous solution. Results of the tests are shown in Table 1.

Water-soluble resins used in Comparative Examples 1-4 are all out of the scope of the present invention; these resins have not been prepared by further addition and polymerization of a water-soluble vinyl monomer.

TABLE 1

| | Results of tests in Examples 1-7 and Comparative Examples 1-4 | | | |
|---|---|---|---|---|
| | ① Viscosity of microcapsule (CPS) | ② Color of capsule liquid (whiteness of CB, %) | ③ Black spots on CF surface of intermediate sheet | Note |
| Example No. | | | | |
| 1 | 45 | Pale gray-purple (80.5) | o | Within the scope of the invention |
| 2 | 30 | Pale gray-purple (80.3) | o | |
| 3 | 40 | Pale gray-purple (79.5) | o | |
| 4 | 37 | Pale gray-purple (80.0) | o | |
| 5 | 35 | Very pale gray-purple (81.4) | o | |
| 6 | 33 | Very pale gray-purple (81.5) | o | |
| 7 | 28 | Very pale gray- | o | |

TABLE 1-continued

| | Results of tests in Examples 1–7 and Comparative Examples 1–4 | | | |
|---|---|---|---|---|
| | 1 Viscosity of microcapsule (CPS) | 2 Color of capsule liquid (whiteness of CB, %) | 3 Black spots on CF surface of intermediate sheet | Note |
| | | purple (82.0) | | |
| Comparative Example No. | | | | |
| 1 | 200 | Dense gray-purple (76.5) | o | Out of the scope of the invention |
| 2 | 110 | Pale gray-purple (80.3) | o | |
| 3 | 45 | Very pale gray-purple (82.0) | x | |
| 4 | 40 | Very pale gray-purple (81.5) | x | |

Remarks:
① The viscosity measured with a B-type of viscometer at a concentration of 40%, pH 9, and a temperature of 20° C.
③ o: No black spot was observed or it was less than a certain limit.
x: Many black spots were observed.

It can be seen from Table 1 that; when the water-soluble resin is a styrene-maleic anhydride copolymer (Comparative Example 1), the capsule emulsion has a high viscosity and a dense color, and the whiteness of the CB coating surface is inferior; when the above copolymer is partly esterified (Comparative Example 2), the whiteness is markedly increased but the viscosity of the emulsion is still high; when the esterification degree is further raised (Comparative Example 3), the viscosity of the emulsion drops markedly to a level favorable for coating, but a number of black spots appear on the CF surface of the intermediate sheet because conceivably of increased coarse oil particles; and even when another water-soluble resin is added to the copolymer (Comparative Example 4), no improvement is observed.

On the contrary, when the novel water-soluble resin of the present invention obtained by polymerizing a water-soluble vinyl monomer in an aqueous solution of a multipolymer of styrene-maleic anhydride-maleic ester is used (Examples 1–7), excellent results are obtained, that is to say, the capsule emulsion has low viscosity and high whiteness and no black spot is observed on the CF surface of the intermediate sheet.

In the above examples and comparative examples, the pH of the system during the encapsulation was from 4 to 5. When this pH is raised to a level of 5.5 to 6.5, results good, though slightly inferior, are obtained, but the time required for encapsulation is prolonged 2 to 3 times or more and hence the microcapsule productivity lowers markedly.

The chief aim of the present invention resides in this point. High quality microcapsules with high productivity have been obtained only by the improved process of the invention.

The following tests were made since the comparison of Example 5 with Comparative Examples 3 and 4 is important.

EXAMPLE 8

Stability of the emulsion

An oily solution (100 g) of 6 parts of 3-N,N-diethylamino-6-methyl-7-anilinofluoran in 100 parts of diisopropylnaphthalene is added to 100 g of a 5% aqueous solution of the water-soluble resin sample, the mixture is stirred vigorously in a mixture at 60° C. to form an emulsion, and after 24 hours' standing of the emulsion, the separation of an oily solution is examined. The emulsion is rated with the mark of o when the separation of an oily solution is scarcely observed, viz. the stability of the emulsion is good, and with the mark of x when the separation of an oily solution is distinctly observed, viz. the stability of the emulsion is poor.

Black spots

The emulsion sample of 20% microcapsules is applied directly on the color-developer coating of the CF sheet, and after drying, the number of black spots per 100 cm$^2$ is counted.

For practical use, this number is desired to be not more than 10/100 cm$^2$.

Results of these test are shown in Table 2.

TABLE 2

| Water-soluble resin | Stability of emulsion | Black spots (number/100 cm$^2$) |
|---|---|---|
| Styrene-maleic anhydride-monomethyl maleate (50:15:35 in molar ratio) terpolymer (Comparative Example 3) | x | 45 |
| The same terpolymer as above + Poly(sodium 2-acrylamide-2-methylpropanesulfonate) (Comparative Example 4) | x | 42 |
| Product of polymerizing sodium 2-acrylamide-2-methylpropanesulfonate in the presence of the same terpolymer as above (Example 5) | o | 9 |

The following reference example illustrates a process for producing the novel water-soluble resin used in the present invention.

Reference Example

A 5-liter 4-necked flask was charged with 29.4 g (0.3 mole) of maleic anhydride, 91 g (0.7 mole) of monomethyl maleate, and 60 g of methyl isobutyl ketone as a reaction solvent, and flushed with nitrogen gas. After heating the mixture to 105° C., 104 g (1 mole) of styrene and then a solution of 0.22 g of t-butyl peroxybenzoate in 50 g of methyl isobutyl ketone were added dropwise over 90 minutes under a stream of nitrogen. The reaction mixture was kept at temperature of 105° C. for 2 additional hours, and to complete the polymerization, a solution of 2.2 g of t-butyl peroxy-2-ethylhexanoate in 10 g of methyl isobutyl ketone was added dropwise over 30 minutes and the reaction mixture was further kept at the same temperature for 1 hour.

After cooling the resulting mixture, a suitable amount of aqueous sodium hydroxide solution and the solvent was distilled off by blowing steam into the mixture in the ordinary manner, thus giving an aqueous solution containing 224.4 g of a terpolymer of styrene-maleic anhydridemonomethyl maleate (50 : 15 : 35 in molar ratio).

To this solution were added an aqueous solution containing 44.8 g of sodium 2-acrylamide-2-methylpropane-sulfonate and further water in an amount necessary to dilute the polymerization mixture to a concentration of 10%. The temperature of the mixture was adjusted to 80° C., and then the polymerization was initiated by adding 1.35 g of potassium persulfate and completed by keeping the reaction mixture at the same temperature for 2 additional hours.

The resulting mixture was then diluted with water to a concentration of 5% to make up a novel water-soluble resin in the form of solution for use in the process of the invention for producing microcapsules.

Effects of the present invention are as follows: As evident from the results of the above-examples the invention has provided a microcapsule production process favorable in that the emulsion stability of fine hydrophobic particles (liquid) in water is superior and the produced emulsion of microcapsules exhibits a low viscosity.

In particular, when the process of the invention is applied to produce microcapsules for pressure-sensitive recording sheets, the emulsion of microcapsules is highly suited for coating because of a low viscosity thereof, little-colored microcapsules are obtained even at a lowest possible pH and therefore the recording paper surface coated with these microcapsules shows high whiteness, and the resulting pressure-sensitive recording paper is free of undesirable color spots which may cause misreading of recorded letters.

What is claimed is:

1. A process for producing microcapsules containing a hydrophobic material as core material, which comprises polymerizing at least one water-soluble vinyl monomer in an aqueous solution of oil-soluble vinyl monomer-maleic anhydride-maleic ester multipolymer to prepare a water-soluble resin, dispersing or emulsifying a hydrophobic material in an acidic aqueous solution of the resulting water-soluble resin to form fine discrete particles, combining an amino resin precursor separately prepared with the dispersion or emulsion, and reacting the precursor by heating the mixture in an acidic state to form capsule walls, whereby the capsule emulsion produced has low viscosity and high whiteness and is useful for preparing recording sheets substantially free from black spots.

2. The process for producing microcapsules according to claim 1, wherein the amino resin precursor is (1) an amino compound-formaldehyde precondensation product which is obtained by reacting formaldehyde with at least one amino compound selected from the group consisting of melamine, guanamine, urea, and a methylol-substitution product of the above amino compound and/or a low molecular weight polymer thereof or (2) an alkyl ether compound derived from a methylol-substitution product of the above amino compound and/or a low molecular weight polymer thereof.

3. The process for producing microcapsules according to claim 1, wherein the oil-soluble vinyl monomer is a member selected from the group consisting of ethylene, methyl vinyl ether, propylene, isobutylene, butadiene, vinyl acetate, linear α-olefins of 4-14 carbon atoms, and styrene.

4. The process for producing microcapsules according to claim 1, wherein the water-soluble vinyl monomer is a member selected from the group consisting of acrylamide, N-methylolacrylamide, 2-acrylamide-2-methylpropanesulfonic acid and salts thereof, allylsulfonic acids and salts thereof, styrenesulfonic acid and salts thereof, acrylic acid and salts thereof, methacrylic acid and salts thereof, vinyl acetate, methyl vinyl ketone, and methyl vinyl ether.

5. The process for producing microcapsules according to claim 1 wherein the amino resin precursor is (1) an amino compound-formaldehyde precondensation product which is obtained by reacting formaldehyde with at least one amino compoound selected from the group consisting of melamine, guanamine, urea, and a methylol-substitution product of the above amino compound and/or a low molecular weight polymer thereof or (2) an alkyl ether compound derived from a methylol-substitution product of the above amino compound and/or a low molecular weight polymer thereof;

wherein the oil-soluble vinyl monomer is a member selected from the group consisting of ethylene, methyl vinyl ether, propylene, isobutylene, butadiene, vinyl acetate, linear α-olefins of 4-14 carbon atoms, and styrene; and wherein the water-soluble vinyl monomer is a member selected from the group consisting of acrylamide, N-methylolacrylamide, 2-acrylamide-2-methylpropanesulfonic acid and salts thereof, allysulfonic acids and salts thereof, styrenesulfonic acid and salts thereof, acrylic acid and salts thereof, methacrylic acid and salts thereof, vinyl acetate, methyl vinyl ketone, and methyl vinyl ether.

6. The process for producing micro capsules according to claim 1 wherein a ratio of said oil-soluble vinyl monomer maleic anhydride-maleic ester to said water-soluble vinyl monomer is in the range of from 112.2:22.4 to 113:80.

* * * * *